United States Patent
Chinya et al.

(10) Patent No.: US 9,003,164 B2
(45) Date of Patent: *Apr. 7, 2015

(54) PROVIDING HARDWARE SUPPORT FOR SHARED VIRTUAL MEMORY BETWEEN LOCAL AND REMOTE PHYSICAL MEMORY

(71) Applicant: Intel Corporation, Santa Clara, CA (US)

(72) Inventors: Gautham N. Chinya, Hillsboro, OR (US); Hong Wang, Santa Clara, CA (US); Deepak A. Mathaikutty, Santa Clara, CA (US); Jamison D. Collins, San Jose, CA (US); Ethan Schuchman, Santa Clara, CA (US); James P. Held, Portland, OR (US); Ajay V. Bhatt, Portland, OR (US); Prashant Sethi, Folsom, CA (US); Stephen F. Whalley, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/221,741

(22) Filed: Mar. 21, 2014

(65) Prior Publication Data

US 2014/0208042 A1 Jul. 24, 2014

Related U.S. Application Data

(63) Continuation of application No. 12/562,477, filed on Sep. 18, 2009, now Pat. No. 8,719,547.

(51) Int. Cl.
G06F 12/10 (2006.01)
G06F 12/12 (2006.01)

(52) U.S. Cl.
CPC ........ G06F 12/1036 (2013.01); G06F 12/1027 (2013.01); G06F 12/121 (2013.01); *G06F 2212/254* (2013.01)

(58) Field of Classification Search
CPC ............ G06F 12/1027; G06F 12/1009; G06F 12/1036; G06F 12/10; G06F 12/1081; G06F 12/109
USPC .......... 711/200, 202–203, 206–207, E12.001, 711/E12.002, E12.061
See application file for complete search history.

(56) References Cited

U.S. PATENT DOCUMENTS

| | | |
|---|---|---|
| 5,247,629 A | 9/1993 | Casamatta et al. |
| 5,301,287 A | 4/1994 | Herrell et al. |

(Continued)

FOREIGN PATENT DOCUMENTS

| | | |
|---|---|---|
| CN | 101187902 | 5/2008 |
| JP | 10-503310 | 6/1997 |
| JP | 10-320272 | 11/1998 |
| JP | 2000-231549 | 8/2000 |

OTHER PUBLICATIONS

Taiwanese Patent Office, Office Action mailed Mar. 7, 2014 in Taiwanese application No. 099124707.

(Continued)

*Primary Examiner* — Jasmine Song
(74) *Attorney, Agent, or Firm* — Trop, Pruner & Hu, P.C.

(57) ABSTRACT

In one embodiment, the present invention includes a memory management unit (MMU) having entries to store virtual address to physical address translations, where each entry includes a location indicator to indicate whether a memory location for the corresponding entry is present in a local or remote memory. In this way, a common virtual memory space can be shared between the two memories, which may be separated by one or more non-coherent links. Other embodiments are described and claimed.

20 Claims, 8 Drawing Sheets

(56) References Cited

U.S. PATENT DOCUMENTS

| | | | |
|---|---|---|---|
| 5,361,340 | A | 11/1994 | Kelly et al. |
| 5,897,664 | A | 4/1999 | Nesheim et al. |
| 5,953,741 | A | 9/1999 | Evoy et al. |
| 6,252,612 | B1 | 6/2001 | Jeddeloh |
| 6,282,601 | B1 | 8/2001 | Goodman et al. |
| 6,317,706 | B1 | 11/2001 | Saib |
| 6,408,386 | B1 | 6/2002 | Hannond et al. |
| 6,418,523 | B2 | 7/2002 | Porterfield |
| 6,604,187 | B1 | 8/2003 | McGrath et al. |
| 6,651,163 | B1 | 11/2003 | Kranich et al. |
| 6,766,424 | B1 | 7/2004 | Wilson |
| 6,925,547 | B2 | 8/2005 | Scott et al. |
| 7,065,633 | B1 | 6/2006 | Yates, Jr. et al. |
| 7,487,341 | B2 | 2/2009 | Wang |
| 2003/0009640 | A1 | 1/2003 | Arimilli et al. |
| 2003/0101334 | A1 | 5/2003 | Desoli |
| 2004/0044872 | A1 | 3/2004 | Scott |
| 2006/0150164 | A1 | 7/2006 | Hankins et al. |
| 2006/0224858 | A1 | 10/2006 | Wang et al. |
| 2007/0005927 | A1 | 1/2007 | Khosravi et al. |
| 2007/0006231 | A1 | 1/2007 | Wang et al. |
| 2008/0104328 | A1 | 5/2008 | Yoshikawa et al. |
| 2010/0332693 | A1 | 12/2010 | Ben-Yehuda et al. |

OTHER PUBLICATIONS

State Intellectual Property Office, P.R. China, Office Action mailed Dec. 13, 2013 in Chinese application No. 201010293493.4.

State Intellectual Property Office of People's Republic of China, Office Action and Supplementary Search Report mailed Jul. 22, 2013 in Chinese application No. 201010293493.4.

State Intellectual Property Office of People's Republic of China, Office Action and Search Report mailed Feb. 7, 2013 in Chinese application No. 201010293493.4.

Japanese Patent Office, Office Action mailed Jan. 29, 2013 in Japanese application No. 2010-205550.

Japanese Patent and Trademark Office, Office Action mailed Sep. 18, 2012 in Japanese application No. 2010-205550.

Japanese Patent and Trademark Office, Japanese Laid-Open patent application No. 2003-316646.

Japanese Patent and Trademark Office, Japanese Laid-Open patent application No. 2003-337714.

German Patent and Trademark Office, Office Action dated Apr. 11, 2011 in German patent application No. 10 2010 035 603.4-53.

PCT/US2007/072243 International Search Report with Written Opinion of the International Searching Authority mailed Oct. 31, 2007.

Japanese Patent Office, Japanese Office Action Mailed Oct. 8, 2014, in Japanese Application No. 2013-195581.

PROVIDING HARDWARE SUPPORT FOR SHARED VIRTUAL MEMORY BETWEEN LOCAL AND REMOTE PHYSICAL MEMORY

This application is a continuation of U.S. patent application Ser. No. 12/562,477, filed Sep. 18, 2009, the content of which is hereby incorporated by reference.

BACKGROUND

As processor-based systems advance, the availability of programmable accelerators connected to the system via a high speed peripheral interconnect such as a Peripheral Component Interconnect Express (PCIe™) interconnect in accordance with links based on the PCI Express™ Specification Base Specification version 2.0 (published Jan. 17, 2007) (hereafter the PCIe™ Specification) or another such protocol, allows system integrators to pack more computational horsepower into a system. However, challenges exist in ensuring that an application can transparently utilize the additional compute horsepower without making significant changes to the application to manually split the computation between a main processor (e.g., a multicore central processing unit (CPU)) and the accelerator(s) and manage movement of data back and forth. Traditionally, only the main system memory that is managed by the operating system (OS) is allocated for applications to use. The physical memory that is local to any accelerator coupled via a peripheral interconnect is managed separately. In particular, such local memory on the accelerator is not visible as part of the system memory recognizable by the OS running on the main processor. Instead, device driver software is responsible to explicitly manage data movement between local memory and remote memory.

The physical memory that is accessed by the processor is managed by the operating system which virtualizes access to this physical memory to create an illusion of a contiguous large virtual address space. The OS uses underlying processor support for virtual memory management, as the processor allows the software to set up a mapping table to map virtual pages to physical pages. The processor supports virtual memory address translation by consulting the mapping table every time a memory access needs to be made. Frequently accessed translations can be cached by the processor to speed up this process. These mapping tables, commonly referred to as page tables, also contain attribute bits such as read/write and user/supervisor privilege bits that control access to a given virtual page. While the OS manages the physical memory available on the motherboard (the system memory), it does not manage or allocate memory that is local to and available on an accelerator. Thus current solutions create a shared memory model as seen by the programmer and depend on memory protection mechanisms to fault and move the pages back and forth between different memories.

DETAILED DESCRIPTION

Figure 1:
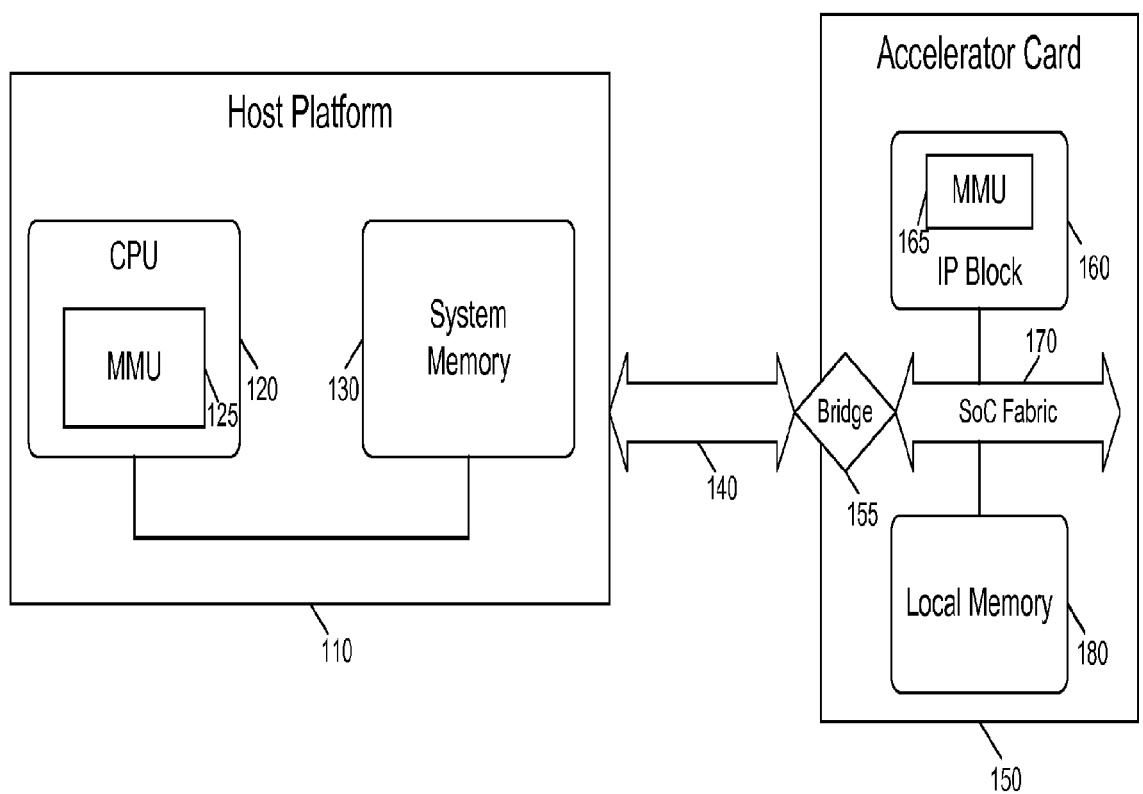
FIG. 1 is a block diagram of a system in accordance with one embodiment of the present invention.

Embodiments enable a processor (e.g., a central processing unit (CPU) on a socket) to create and manage a fully shared virtual address space with accelerators that are interconnected to the system by an interface, e.g., a Peripheral Component Interconnect Express (PCIe™) interface, by accessing memory that is present on the accelerator and addressing the memory using special load/store transactions. The ability to address remote memory directly allows the effective compute capacity as seen by application software to increase, and allows applications to seamlessly share data without explicit involvement of the programmer to move data back and forth. In this way, memory can be addressed without having to resort to memory protection and faulting on virtual address access to redirect the memory access to be completed from a fault handler. As such, existing shared memory multicore processing can be extended to include accelerators that are not on the socket but instead are connected via a peripheral non-coherent link.

In contrast, typical systems such as cluster-based systems create a partial shared memory model as seen by the programmer and depend on memory protection mechanisms to fault and move pages back and forth between CPU and peripheral devices. Also, in cluster-based systems each node runs a separate copy of the operating system (OS) stack on top of which an application runs and this aspect of the system is exposed to programmers, as only a portion of the address space is shared and the programmer either allocates from a shared area or explicitly specifies what portion of the data is placed in shared address space. The execution environment differs from a fully shared memory execution environment that resembles a single shared memory multicore system.

Instead in various embodiments, a processor on socket can address remote memory that is local to an accelerator, which allows the processor to transparently use remote memory addresses to access shared data. To effect this, architectural extensions may be provided to allow a virtual memory management system to be enhanced so that special load/store transactions can be issued to address remote shared data and further to enable the system to move memory pages to be closer to where they are accessed more frequently, without requiring explicit programmer involvement to do so. In addition, memory management extensions allow the programmer to directly run application code without having to explicitly indicate which portions of the address space have to be shared or for the programmer to manage a common shared data area.

As such, a shared virtual address space between cores on cache-coherent CPU sockets and accelerators (including multicore CPUs) that are interconnected to the system via a peripheral interconnect can be created and managed. Thus CPUs/accelerators on both sides of the interconnect can access a shared virtual page which may be physically located in system memory or on a memory local to the accelerator across an interconnect, which may or may not be cache-coherent.

Accordingly, physical memory local on the accelerator can behave as additional system memory to the CPU and in turn to the OS and applications, even though the accelerator's local memory is across an interconnect and not directly accessible by the CPU through a coherent fabric (such as a front side bus (FSB) or a quick path interconnect (QPI)).

Embodiments may be implemented in many different system types. Referring now to FIG. 1, shown is a block diagram of a system in accordance with one embodiment of the present invention. As shown in FIG. 1, system 100 may be an exemplary computer system having a host personal computer (PC) platform 110 that is coupled to an accelerator card 150 via a non-coherent interconnect 140 which may be a PCIe™ link, for example. As seen, host platform 110 may include a CPU 120 and a system memory 130 which, in some embodiments may be a dynamic random access memory (DRAM). While shown with only these minimal components for ease of illustration in FIG. 1, understand that a given platform may include many other typical components including input/output hubs, chipset components, peripheral devices, mass storage devices, input/output devices and so forth.

As seen in FIG. 1, CPU 120 may include a memory management unit (MMU) 125. MMU 125 may enable mapping of virtual addresses to physical addresses and in some implementations may include one or more translation lookaside buffers (TLBs). As will be discussed further below, various architectural extensions to a MMU in accordance with an embodiment of the present invention may enable creation and usage of a shared virtual memory between memories associated with platform 110 and accelerator card 150.

Referring still to FIG. 1, accelerator card 150 may include an intellectual property (IP) block 160, which may be any type of accelerator, such as a graphics processing unit, CPU or any other such device. As seen, this IP block may itself include an MMU 165. To enable communications with platform 110, a bridge 155 may be present to transform communications occurring according to a protocol for interconnect 140 to a protocol consistent with that used on a system on a chip (SoC) fabric 170 which in turn couples IP block 160 to a local memory 180, which again in some embodiments may be DRAM. While shown with this particular implementation in the embodiment of FIG. 1, the scope of the present invention is not limited in this regard.

Embodiments may implement reverse proxy execution (RPE), which enhances a CPU's ability to identify physical memory accesses outside on-board (e.g., motherboard) system memory. Then accesses to such locations may be converted into a class of accesses that are tunneled across the peripheral fabric to the accelerator. The accelerator in turn services the accesses from its local physical memory. Using RPE and proxy execution (in which a CPU may assist in completion of a memory access under request of an accelerator) in combination, any accelerator with a separate MMU coupled via a (coherent or non-coherent) fabric to a multi-socket CPU, can build a shared virtual address space for physical memory including both system memory and accelerator local memory. Using RPE and proxy execution, an embodiment may allow the same multithreaded shared virtual memory-based program built for traditional symmetric multiprocessing (SMP) to spread threads across CPUs that are either across multiple CPU sockets or across multiple stops on a peripheral I/O fabric.

Along with architectural mechanisms, embodiments may also include firmware and system software extensions that allow control and data transfers between cores on the sockets and the accelerator (or CPUs) across a peripheral interconnect to work transparently at different level of abstractions, ranging from totally OS-unaware to OS-aware, each with different options for optimization.

Data can be shared on a demand basis based on access patterns to the shared data from the CPU side as well as the accelerator side. Accelerators that can work with virtual addresses and support address translation can transparently run the same code with references to the data and code being kept intact, as the same virtual addresses can be used when referring to the code or data when the accelerator executes a portion of the application program. The physical page containing the code or data can be located either locally to the accelerator or can be fetched from system memory. The virtual page can be moved from a remote location to a local location based on the frequency of access without explicit involvement of the application software stack to do so, as the application need not manage data movement to set up computation on the accelerator.

Driver software is often tasked with the job of explicitly moving data in bulk using direct memory access (DMA) transfers between main system memory and remote memory that is local to the accelerator. In the traditional driver model, an application program running on a CPU and a driver program managing an accelerator typically reside in two distinct virtual address spaces. Consequentially significant overhead is usually incurred for data communications between the application and the driver and the data transfer between the system memory and the accelerator local memory. Further, this data transfer is typically implemented by application code written by the programmer. For example, a programmer may be required to use a vendor specific set of application programming interfaces (APIs) to manually move data from the system memory to accelerator memory. Instead, the creation of a shared virtual address space between the CPU and accelerator cores in accordance with an embodiment of the present invention without needing explicit management of DMA operations greatly simplifies data sharing, as the entire application code and data can be placed in a common shared virtual address space without having to explicitly move the data by changing the application program, e.g., with a programmer's explicit orchestration of DMA operations. Thus, although data transfers can still be by DMA, they are not programmer controlled. In other words, a processor may directly access data present in a remote memory during execution of a user level application without explicit programming by the programmer to configure and manage the underlying fabrics to enable the data access.

In order to construct a shared address space between the CPU and accelerator, a memory management unit may allow load/store accesses to the shared virtual address space to be sent to the remote memory based on the contents of page tables used to translate virtual-to-physical addresses.

System software support may allow a run-time system to transparently and dynamically migrate the location of a virtual page so that a common shared virtual address space between CPU and accelerator can be created and the run-time working-set locality behavior of the program is utilized to locate the virtual page either remotely if the accesses are infrequent or locate them locally for frequently accessed pages.

In various embodiments, different mechanisms to extend virtual memory support may be provided. One implementation does not include any OS change to existing legacy paging system design, while other implementations can add more information to the page table entries. These mechanisms involve similar architectural mechanisms to support reverse proxy execution, that is, the ability for the CPU to identify and service those virtual address accesses that are mapped not on the system memory, but instead to the remote physical memory local to the accelerators across a peripheral fabric.

To support RPE a CPU may identify whether a given virtual address is mapped to system memory or to a remote memory across a peripheral fabric. If the physical address is mapped to system memory, the access may be handled locally with a normal memory access, otherwise RPE may be indicated to handle the access. In one embodiment, the RPE may be implemented using a dedicated microcode flow. RPE may begin by tagging the access (e.g., a load/store (LD/ST)) with a special fault condition that will be handled by a microcode handler. The handler may convert the access into READ/WRITE/DMA transactions across the peripheral fabric, although several variations may be possible. For simplicity of description, assume that the peripheral fabric is a PCIe™ interconnect and each individual access to the remote physical memory is converted into a non-cacheable access and in turn into PCIe™ data transactions to tunnel the request/data across the PCIe™ fabric. The transaction can encapsulate either the original virtual address or the physical address. The CPU thread performing the access may, in some embodiments stall pending completion of the remote access (and may switch to another thread). When the accelerator receives the PCIe™ transaction notifying of an access request from the CPU, the sequencer in the accelerator handles the request as a special interrupt event. The sequencer extracts the access address and access type from the request. If the access address is a virtual address, the sequencer may perform the translation locally via a local MMU to obtain the physical address. Using the physical address, the accelerator sequencer either commits the store (if a write transaction) or obtains data for the load (if a read transaction). The sequencer will encapsulate a reply (e.g., in the case of a load) into a PCIe™ transaction and send back to the host root (i.e., the CPU). The CPU core receives the PCIe™ transaction and status of the completed access and resumes the successive operation, which can raise an access fault based on the access status of the remote access.

Figure 2:
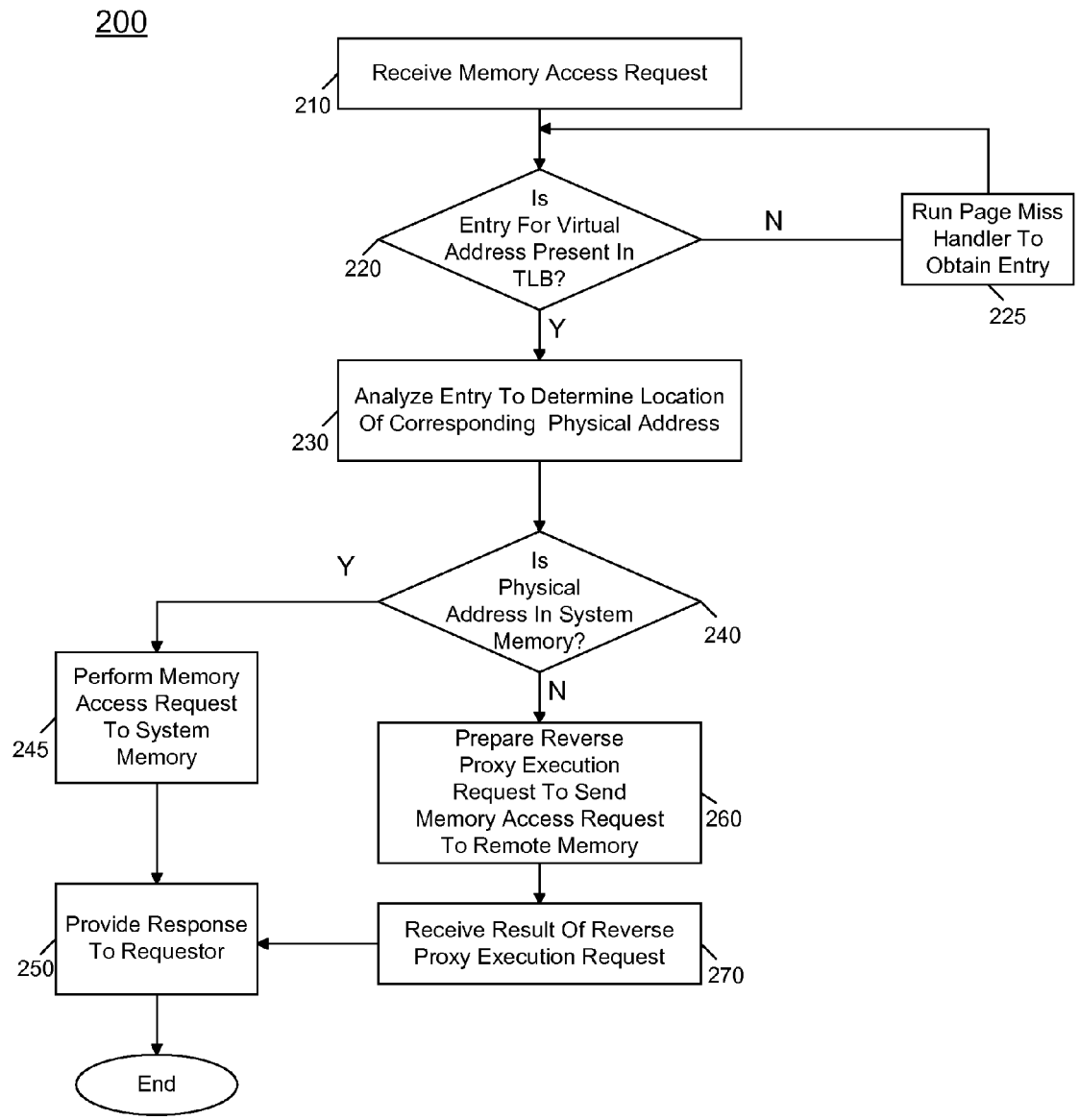
FIG. 2 is a flow diagram of a method for reverse proxy execution in accordance with an embodiment of the present invention.

Referring now to FIG. 2, shown is a flow diagram for reverse proxy execution in accordance with an embodiment of the present invention. As shown in FIG. 2, method 200 may be used to access data present on a local memory of an accelerator, i.e., a remote memory with respect to a CPU. As seen in FIG. 2, method 200 may begin by receiving a memory access request (block 210). This request may be received in a host CPU, which in turn may forward the request to a MMU, e.g., a TLB to determine whether the entry is for a virtual address present in the TLB (diamond 220). If not, a page miss handler may be executed to obtain and store the entry into the TLB (block 225).

When the entry is present in the TLB, it may be analyzed to determine a location of the corresponding physical address (block 230). For example, as discussed further below, each TLB entry may include information to indicate whether the corresponding page is present in local (i.e., system memory) or remote memory. If the physical address is present in system memory (diamond 240), control passes to block 245, where a memory access request may be performed to the system memory and accordingly, the requested data may be provided as a response to the requestor (block 250).

If instead it is determined at diamond 240 that the physical address is not in system memory, control instead passes to block 260. At block 260, a reverse proxy execution request may be prepared to send the memory access request to the remote memory (e.g., a local memory of an accelerator) that includes the data. In various implementations, this request may be tunneled across a non-coherent interconnect, e.g., as a specialized load/store request. After this reverse proxy execution request is handled on the accelerator, control passes to block 270 where the result of the reverse proxy execution request is received, namely the requested data is received and a response can be provided to the requestor, discussed above with regard to block 250. While shown with this particular implementation in the embodiment of FIG. 2, the scope of the present invention is not limited in this regard.

Figure 3:
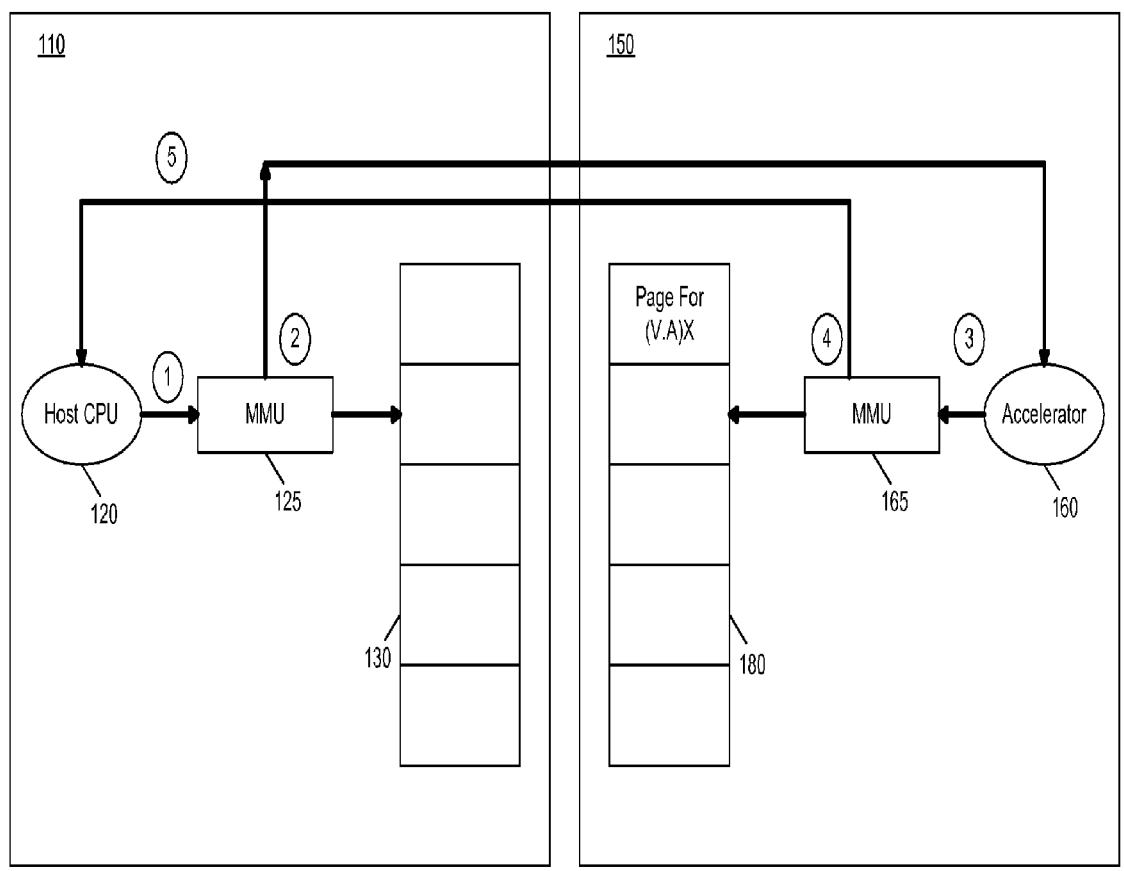
FIG. 3 is a block diagram illustrating reverse proxy execution operations in accordance with an embodiment of the present invention.

Referring now to FIG. 3, shown is a block diagram illustrating operations for reverse proxy execution in accordance with an embodiment of the present invention. As shown in FIG. 3, when a request to access (1) a virtual address (V.A)X from CPU 120 to MMU 125 fails (e.g., the lookup indicates that the page is present in the local memory of the accelerator card), a reverse proxy execution request is prepared and sent (2) to accelerator card 150. In turn, accelerator 160 processes the request to send the memory access request (3) to MMU 165, which in turn accesses (4) the requested page in local memory 180 so that the requested data can be sent back to CPU 120 (5). Note that the data from the accelerator can be sent to the host CPU via DMA or polling all under the host inside its glorified LD/ST implementation (e.g., in microcode flow). In other words, once the CPU sends out an access to a remote memory location, the CPU turns the access to a microcode routine to perform a glorified LD/ST, which will either wait for a DMA interrupt or perform active polling to attain the "return" data from the accelerator. The completion of the memory access to (V.A)X is carried out in a manner that is transparent to the application program that accessed the memory location identified at virtual address X.

Overall, the RPE operation acts like a long latency memory access operation across a non-uniform memory architecture (NUMA) system. The underlying tunneling mechanism may vary depending on the nature of the fabric. In the case of a PCIe™ fabric, due to the asymmetry between root (system) and child (accelerator) complex, where the accelerator can access to a range of system memory even though the CPU cannot usually access any of accelerator's local memory, various optimizations of RPE performance mechanisms may be realized by using part of the system memory or accelerator's local memory as private memory. In one embodiment, part of system memory can be reserved as cache for the remote accelerator local memory. Or a private memory region can be allocated to act as a buffer to hold the virtual pages that are accessed remotely. For, e.g., the access to a virtual address X which is mapped to a remote page may result in the entire page being temporarily read into the local buffer where it will be available for future accesses to reduce remote memory accesses.

In one embodiment, a proxy execution mechanism may be used in handling a page fault situation incurred on the accelerator sequencer, meaning that the fault can be sent to the CPU for handling. This implies that the MMU on the accelerator sequencer is coherent with the CPU's MMU and all point to the same page table of the OS. A page fault to a virtual page, whether incurred by operation on the CPU or the accelerator, causes the CPU to use a traditional page handling mechanism to bring the page into memory. If the fault originates from an access on the accelerator sequencer, the CPU may install the new page in the remote accelerator local physical memory. Otherwise, the page can be placed in system memory. A non-faulting access on the CPU to a virtual address mapped to remote accelerator local memory will guarantee to map to a physical page on the accelerator, thus ensuring the completion of proxy execution.

Figure 4:
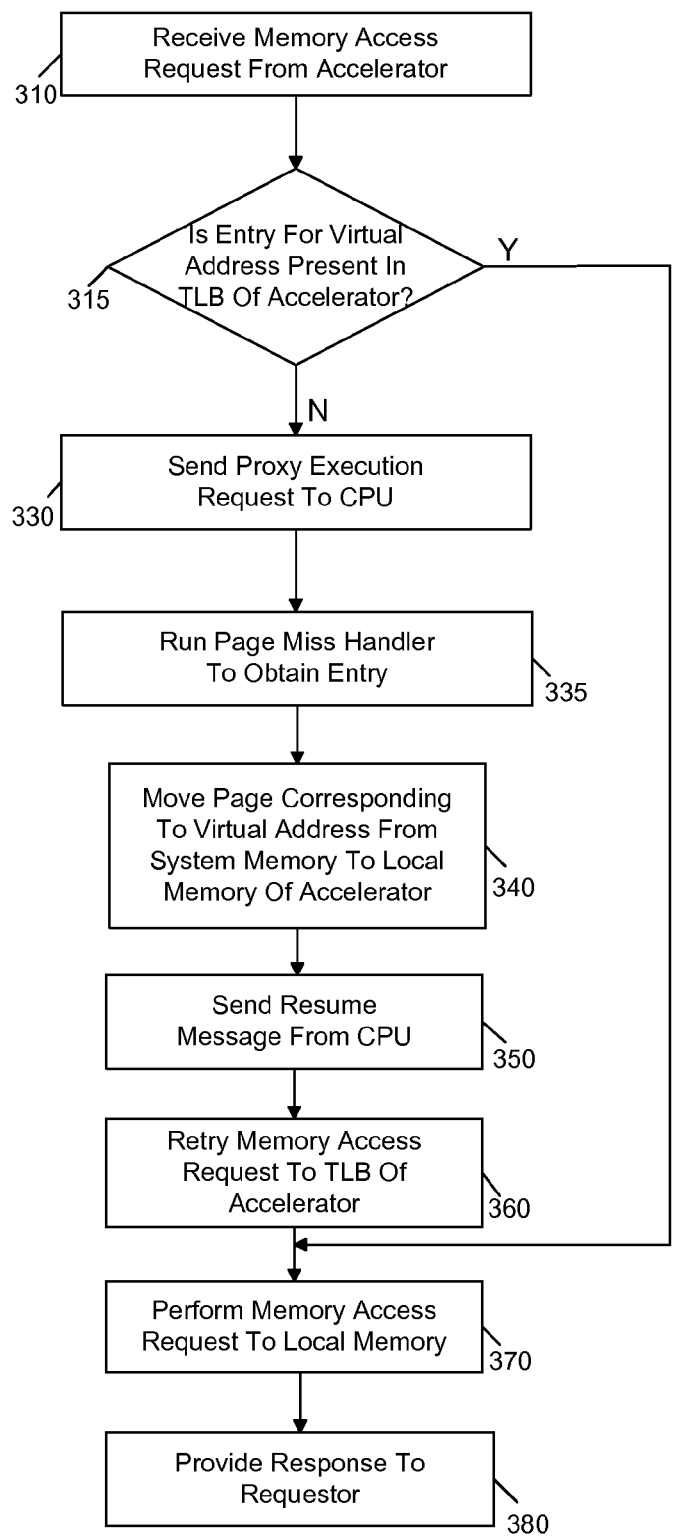
FIG. 4 is flow diagram of a method for proxy execution in accordance with an embodiment of the present invention.

Referring now to FIG. 4, shown is flow diagram of a method for proxy execution in accordance with an embodiment of the present invention. As seen in FIG. 4, method 300 may be used to perform proxy execution when data desired by an accelerator is not present in its local memory.

As seen in FIG. 4, method 300 may begin by receiving a memory access request from an accelerator (block 310). It may then be determined whether an entry for a virtual address of the request is present in a TLB of the accelerator (diamond 350). If so, the local memory of the accelerator may be accessed using this virtual address (block 370), and a response provided to the requestor (block 380).

Otherwise if an entry is not present in the TLB, control passes to block 330 where a proxy execution request may be sent to the CPU (block 330). Assuming the requested translation is not present in the CPU's MMU, a page miss handler may be run to obtain the entry (block 335). Furthermore, the page corresponding to this virtual address may be moved from system memory to the accelerator local memory (block 340). Then a resume message may be sent from CPU to the accelerator (block 350). Accordingly, the accelerator may retry the memory request to its TLB (block 360). As the entry is now present in the MMU, a memory access request may be performed to the local memory to obtain the requested data (block 370). Accordingly, a response including the requested data may be provided to the requestor (block 380).

Figure 5:
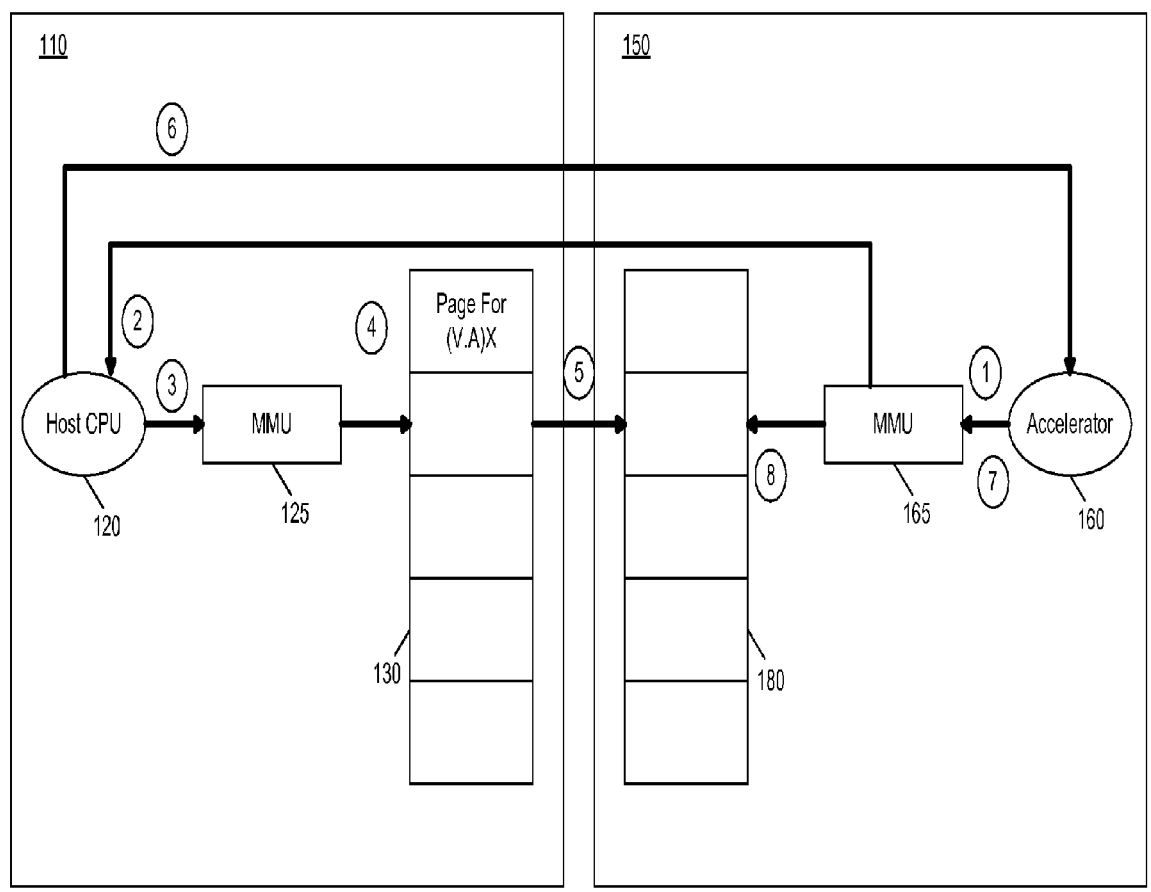
FIG. 5 is a block diagram that illustrates proxy execution operations in accordance with an embodiment of the present invention.

Referring now to FIG. 5, shown is a block diagram that illustrates proxy execution operations in accordance with an embodiment of the present invention. As seen in FIG. 5, proxy execution may occur when an accelerator requests access (1) to a virtual address (V.A)X that is not present in local MMU 165. Accordingly, a proxy execution request (2) on this page fault is sent to CPU 120. FIG. 5 shows an implementation in which MMU 165 directly sends the proxy execution request to CPU 120. However, when the proxy is implemented in page-walking code (microcode, firmware or software, depending on how the MMU is managed), then this code can send the proxy request. CPU 120 sends the request (3) to local MMU 125 which in turn accesses the page in system memory 130 for the requested virtual address (4). As seen, when the request is for the read of data, the entire page may be sent (5) from system memory 130 to local memory 180. In one embodiment, transfer of data may be via CPU 120 which programs DMA to copy data from a region in system memory 130 to a region in local memory 180. Alternatively CPU 120 can perform the copy by running individual "glorified" load/ store instruction sequences, e.g., implemented using microcode as described above. Thereafter, CPU 120 may send a resume message (6) to accelerator 160 which in turn retries the access (7) to MMU 165, which now finds the translation present and sends the request (8) to obtain the corresponding data from local memory 180. Note that to enable access to the data in local memory 180, the MMU 165 is made addressable. CPU 120 may directly perform an individual "glorified" LD/ST to update the translation entry from the page table on the system memory 130 into MMU 165. Alternatively, CPU 120 can copy the page table or a subset of the page table containing the translation to the accelerator side via a data transfer to local memory 180, and then resume accelerator 160, whose page walker will walk the page table, which now resides locally.

The information to distinguish whether a virtual address access on the CPU is local (in the system memory) or remote (in the accelerator's memory) may come from the OS, which learns of such information from the basic input/output system (BIOS), which has full knowledge about a system memory configuration. To support RPE, the BIOS may enumerate an advertised memory size on the accelerator. This operation resembles a read-only memory (ROM)/random access memory (RAM) chip-select performed at boot time by the BIOS. The BIOS then can report the sum of system memory and the accelerator-local memory, and notify the OS of which range of memory is local system memory and which is remote.

In various embodiments a system level state for BIOS, namely a set of descriptor architectural states, referred to as memory partition descriptors, may record this range information, e.g., at minimally, the range information for the system memory, thus any physical address out of this range would be identified as remote. In one embodiment, this information can be stored in a BIOS built-in data structure. The memory descriptors may also be stored as private state in machine specific registers accessible to both software and microcode. Note that such range information is first established by BIOS before the OS starts, so the use of these states does not have dependence on OS. In other words, the RPE mechanism can work with a legacy OS that is not even aware of the distinction between remote and local memory.

For any given LD/ST processed by the CPU, it may be onerous to have each TLB translation also compare the physical address with a memory partition descriptor to decide whether it is a local system memory or remote access. Instead, such check can be performed off the critical path in the MMU and may only occur on a page walk upon filling a new TLB entry. In some embodiments, each TLB entry can include an attribute bit to indicate if the corresponding entry is in remote or local system memory. When a new TLB entry is installed, the page walker can perform a range check of the physical address range in the page table entry against the memory partition descriptor. Note this mechanism works even if the OS does not distinguish between a page mapped locally or remotely.

In some embodiments, the OS can handle the policy behind usage of the accelerator local memory by using the accelerator local memory to only hold that subset of an application's code and data that the accelerator accesses frequently. If an OS is not aware, then a locality principle, e.g., of a runtime layer or other entity, will help move the working set close to where the access happens more frequently, in system memory or accelerator local memory.

Additionally, as described above the OS page table format can include an attribute bit to indicate whether the corresponding page is stored in local or remote memory. This bit can be marked when the OS establishes the virtual address to physical address mapping, and for each physical page the OS can check with the memory partition descriptor to mark the page as local or remote. In this way a range check need not be performed on any installed TLB entry. In order to allow applications to access memory on the accelerator, the CPU may analyze attribute bits so that it can route a load/store to a given virtual address to a remote physical memory location. In addition, the attribute bits may also track the number of accesses that are remotely carried out, enabling the OS software to implement a policy based on the number of remote accesses, such that the page can be migrated to another location if the number of remote accesses exceeds a particular threshold.

Although it is possible to implement remote memory access by enforcing protections of a virtual page, such as marking a page as not accessible or not present and processing resulting faults, access latency increases since the page fault handler needs to run every time a memory access happens. Instead, using an embodiment of the present invention a CPU can present a remote memory location address to a bus controller, which directs the access to the memory location of the accelerator. For example, the CPU can directly redirect load/stores by accessing a standard set of registers defined in the bus controller to access to the remote memory location without any assistance from software to complete the load/store. This data transfer may be by DMA (bulk transfer) or a scalar transfer at cacheline granularity. The ability to transparently move a virtual page from a remote memory location to a local memory location (and vice-versa) allows software (e.g., an application) to share data with the accelerators without explicitly managing movement of the data. In the absence of the accelerator being connected to the system or entering an unresponsive state, the address translation unit produces page faults that indicate the reason why the load/store failed.

Figure 6:
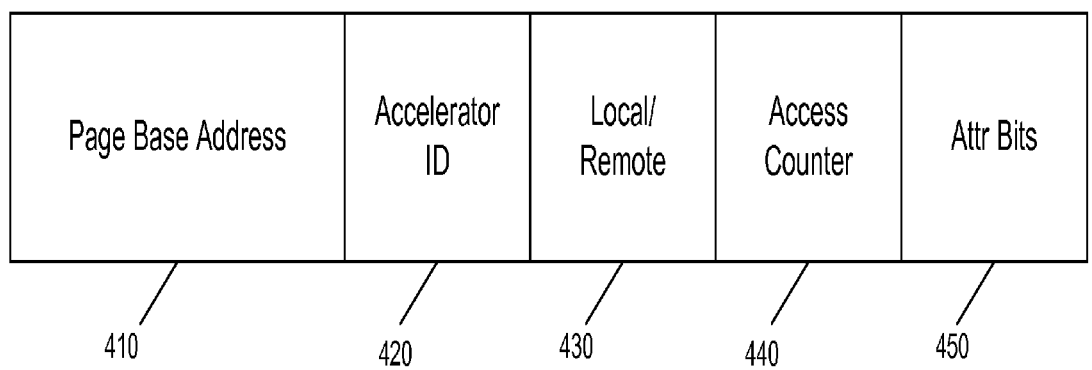
FIG. 6 is an example entry of a page table in accordance with one embodiment of the present invention.

Referring now to FIG. 6, shown is an example entry 400 in a page table in accordance with one embodiment of the present invention. As seen each entry may include a page base address (PBA) field 410 which stores a PBA that points to a first address of a page stored in memory. In addition, each entry may include an accelerator field 420, which stores an n-bit accelerator identifier (ID) to refer to an accelerator that is present in the system that includes the page, a local/remote field 430 to store, e.g., an n-bit indicator, as to whether the corresponding virtual page is stored in local memory or one of possibly multiple remote memories, a counter field 440 to store an m-bit counter that counts the number of accesses that are made to remote memory (such that the counter is only active if the page is in remote memory) and an attribute field 450 to store various bits to indicate different attributes of the page.

In one embodiment, an exception is raised when the value of the access counter reaches zero. This exception allows OS software, e.g., a virtual memory management kernel responsible for page migration, to manage migration policies based on the number of accesses to the given virtual page. That is, the software can manage the virtual address space in which the application works so that the virtual address space can map physical memory pages that are located closer to the CPU or closer to the accelerator. For accelerators coupled to a PCIe™ bus, as the bus is non-coherent, the underlying run-time software may implement the software based coherence mechanism. For a contended access to any shared data structure, a synchronization control like a semaphore can be used such that the producer thread does not release the semaphore until it is ready to hand off the data to the consumer. Before the producer releases the semaphore, it needs to flush all dirty cache lines concerning the shared data into memory. This guarantees that when the consumer thread on the accelerator starts access to the shared data from the memory, the data are coherent, even though the fabric between the host CPU and the accelerator does not support cache coherency. Conversely, when the accelerator completes processing the shared data, similar synchronization and flush mechanisms can be used to ensure memory-based data coherence. Should the fabric between the CPU and the accelerator be cache coherent (e.g., a future generation of PCIe), no flush of dirty lines to memory is required upon handoff before the producer releases the semaphore.

In embodiments with OS support, the allocation and management of memory on the accelerator can be carried out in coordination with the memory manager of the OS which allocates and manages the system memory pages that are given to the application and manages the page tables which are utilized by the CPU to translate virtual addresses to physical addresses. The memory manager also handles exceptions that occur due to the redirection to access remote memory and manages the policy behind migration of the physical pages between the CPU and the accelerator. The page migration policy can vary depending on the behavior of the workload and can potentially be changed to reduce the number of remote accesses (before movement of the corresponding page to the system memory) or implement a first touch policy to move the page to the location where there is a maximum number of accesses. Code and read only data pages can be duplicated in multiple memories to prevent unnecessary movement of the physical pages back and forth. Only the data pages that contain data that is processed during the execution of the program is migrated back and forth based on the locality of access to the data pages.

Figure 7:
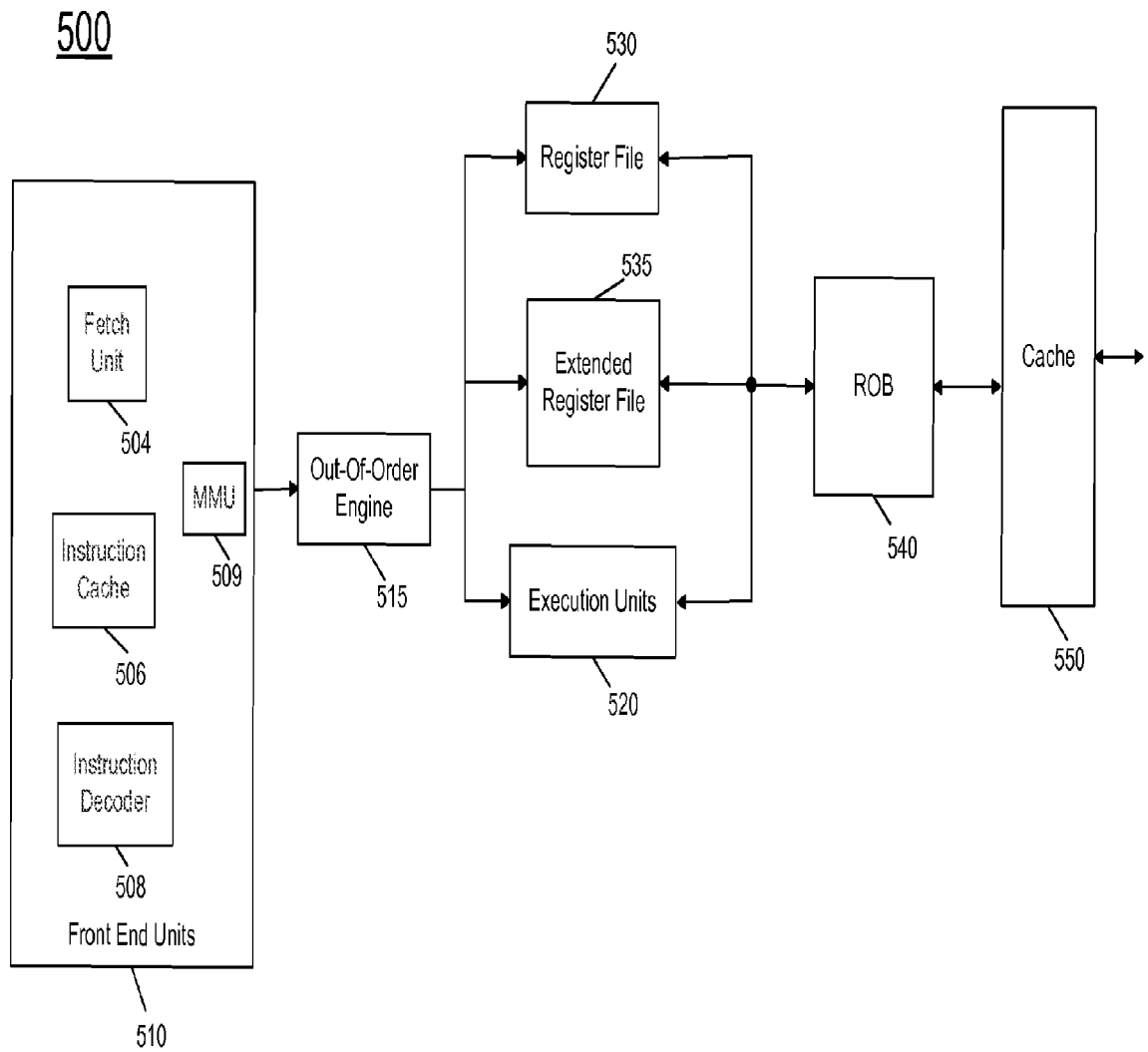
FIG. 7 is a block diagram of a processor in accordance with one embodiment of the present invention.

Referring now to FIG. 7, shown is a block diagram of a processor in accordance with one embodiment of the present invention. As shown in FIG. 7, processor 500 may be a multi-stage pipelined out-of-order processor. Processor 500 is shown with a relatively simplified view in FIG. 7 to illustrate various features used in connection with proxy execution and reverse proxy execution in accordance with one embodiment of the present invention.

As shown in FIG. 7, processor 500 includes front end units 510, which may be used to fetch macro-instructions to be executed and prepare them for use later in the processor. For example, front end units 510 may include a fetch unit 504, an instruction cache 506, and an instruction decoder 508. In some implementations, front end units 510 may further include a trace cache, along with microcode storage as well as a micro-operation storage. Fetch unit 504 may fetch macro-instructions, e.g., from memory or instruction cache 506, and feed them to instruction decoder 508 to decode them into primitives, i.e., micro-operations for execution by the processor. Front end units 510 further includes an MMU 509 in accordance with an embodiment of the present invention to store entries including added state information to handle proxy execution and reverse proxy execution as described herein. Based on such information, operations in a shared virtual memory space including a system memory and local memory of one or more accelerators can be efficiently performed without programmer support for moving data.

Coupled between front end units 510 and execution units 520 is an out-of-order (OOO) engine 515 that may be used to receive the micro-instructions and prepare them for execution. More specifically OOO engine 515 may include various buffers to re-order micro-instruction flow and allocate various resources needed for execution, as well as to provide renaming of logical registers onto storage locations within various register files such as register file 530 and extended register file 535. Register file 530 may include separate register files for integer and floating point operations. Extended register file 535 may provide storage for vector-sized units, e.g., 256 or 512 bits per register.

Various resources may be present in execution units 520, including, for example, various integer, floating point, and single instruction multiple data (SIMD) logic units, among other specialized hardware. Results may be provided to retirement logic, namely a reorder buffer (ROB) 540. More specifically, ROB 540 may include various arrays and logic to receive information associated with instructions that are executed. This information is then examined by ROB 540 to determine whether the instructions can be validly retired and result data committed to the architectural state of the processor, or whether one or more exceptions occurred that prevent a proper retirement of the instructions. Of course, ROB 540 may handle other operations associated with retirement.

As shown in FIG. 7, ROB 540 is coupled to a cache 550 which, in one embodiment may be a low level cache (e.g., an L1 cache) although the scope of the present invention is not limited in this regard. Also, execution units 520 can be directly coupled to cache 550. From cache 550, data communication may occur with higher level caches, system memory and so forth. While shown with this high level in the embodiment of FIG. 7, understand the scope of the present invention is not limited in this regard.

For example, in some implementations an accelerator can be integrated on-chip with the processor. For example, in one architecture, a multi-core processor which may include a number of individual processor cores, along with accelerators which can be heterogeneous cores, e.g., of a graphics processor, or other specialized processing unit. In general, operation of proxy executions and reverse proxy executions may occur in the same manner as described above for on-chip accelerators, which may be coupled to cores by any type of interconnect, including coherent or non-coherent links.

Figure 8:
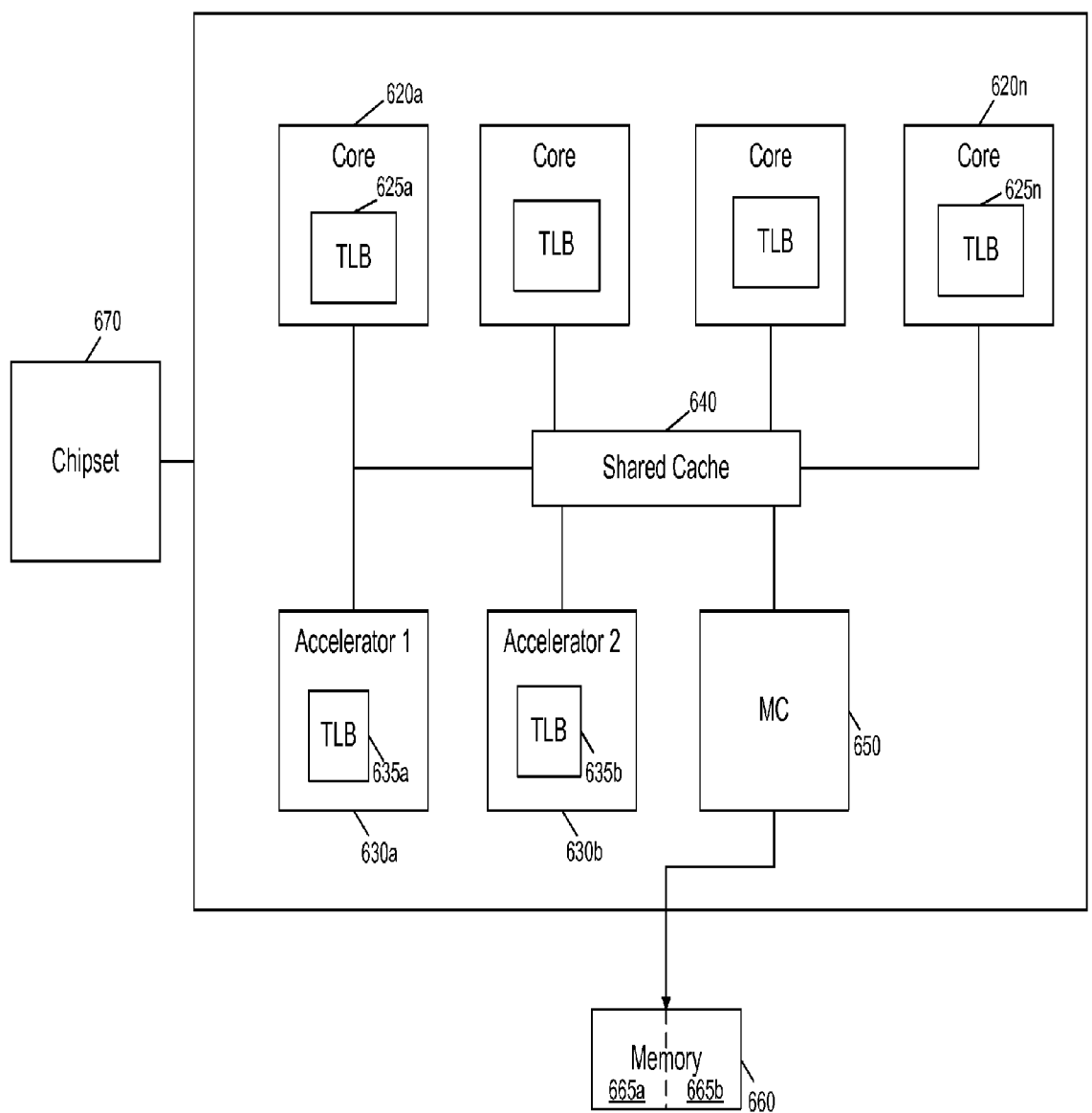
FIG. 8 is a block diagram of a system including on-chip accelerators in accordance with an embodiment of the present invention.

Referring now to FIG. 8, shown is a block diagram of a system in accordance with another embodiment of the present invention. As seen in FIG. 8, system 600 includes a multicore processor 610 that may be formed on a single semiconductor die and including various components. Specifically, in the implementation of FIG. 8, processor 610 may include a plurality of cores $620_a$-$620_n$ each of which may include a TLB $625_a$-$625_n$, which may include entries having translations and additional fields such as discussed above. In turn, the cores can be coupled to a shared cache 640, which may be a shared last level cache, in that each of the individual cores may include its own cache memory. As further seen, processor 610 may also include accelerators. In the embodiment shown, two such accelerators are shown, although the scope of the present invention is not limited in this regard. The connection of the accelerators to the cores may be by any type of interconnect, such as a coherent or non-coherent link, e.g., a PCIe™ link, a shared bus interconnect or so forth. Accelerators $630_a$ and $630_b$ are shown to each include TLBs 635 having entries as described above. In addition, processor 610 may include a memory controller 650.

In one implementation, processor 610 may be coupled to a memory 660, which may be a system memory that can be partitioned into multiple partitions, e.g., including a first partition $665_a$ which can be associated with the processor cores, and a second partition $665_b$, which can be associated with the accelerators. Of course, memories associated with the cores and accelerators may be differently configured, e.g., via different ports and as different memory modules or so forth. Processor 610 may further be coupled to a chipset 670, that in turn can be coupled to various peripheral devices such as input/output devices, storage devices, other accelerators and so forth.

Accordingly, embodiments can provide for handling of proxy executions and reverse proxy executions in different systems that can include integrated accelerators or accelerators coupled via a link, which can be a coherent or non-coherent.

Embodiments may be implemented in code and may be stored on a storage medium having stored thereon instructions which can be used to program a system to perform the instructions. The storage medium may include, but is not limited to, any type of disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
a first core including a first memory management unit (MMU), the first MMU including a plurality of entries to store virtual address to physical address translations; and
an accelerator coupled to the first core and including a second MMU, the second MMU including a plurality of entries to store virtual address to physical address translations, wherein each entry of the first MMU includes a location field to store a first indicator to indicate whether a memory location for the corresponding entry is present in a first memory coupled to the processor or in a second memory coupled to the accelerator and an identifier field to store an identifier of the accelerator, wherein the processor is to execute a handler to convert a memory request for a memory location in the second memory to a direct memory access (DMA) transaction for communication to the second memory.

2. The processor of claim 1, wherein each entry of the first MMU further includes a counter to store a count of a number of accesses to the memory location of the second memory by the processor.

3. The processor of claim 1, wherein the first memory is a system memory.

4. The processor of claim 3, wherein the system memory and the second memory comprise a single virtual address space.

5. The processor of claim 1, wherein when an entry of the first MMU indicates that the memory location is present in the second memory, the processor is to tunnel a memory request to the accelerator via a protocol of a non-coherent interconnect that couples the first core and the accelerator.

6. The processor of claim 1, wherein responsive to a page fault on the second MMU, the accelerator is to request the processor to resolve the page fault.

7. The processor of claim 6, wherein the processor is to cause the first memory to transfer a memory page associated with an address of the page fault to the second memory and to cause a translation for the memory page to be sent to the accelerator for storage in the second MMU.

8. The processor of claim 1, wherein the processor is to directly address a memory location present in the second memory using information in an entry of the first MMU.

9. The processor of claim 1, wherein the processor is to issue a reverse proxy execution request to the accelerator to access data stored in the second memory using information in an entry of the first MMU and without use of a user level application executing on the processor.

10. A non-transitory machine-readable medium having stored thereon instructions, which if performed by a machine cause the machine to perform a method comprising:
receiving a memory access request including a virtual address;
analyzing an entry corresponding to the virtual address stored in a translation lookaside buffer (TLB) of a processor to determine if a physical address (PA) corresponding to the virtual address is present in a first memory associated with the processor or a second memory associated with an accelerator coupled to the processor based on a location attribute of the entry that indicates whether the PA is present in the first memory or the second memory, the first memory and the second memory collectively forming a shared virtual memory space; and if the PA is present in the second memory, sending a reverse proxy execution request to the second memory to perform the memory access request.

11. The non-transitory machine-readable medium of claim 10, wherein the method further comprises determining which of a plurality of second memories each associated with an accelerator in which the PA is located using an identifier field of the entry that indicates the accelerator with which the second memory is associated.

12. The non-transitory machine-readable medium of claim 11, wherein the method further comprises analyzing a counter of the entry indicative of a number of accesses to the PA of the second memory by the processor.

13. The non-transitory machine-readable medium of claim 10, wherein the method further comprises moving information from the PA of the second memory to the first memory when a counter of the entry indicative of a number of accesses to the PA of the second memory by the processor reaches a threshold value, without involvement of an application executing on the processor.

14. The non-transitory machine-readable medium of claim 10, wherein the method further comprises setting a memory configuration of a system including the first memory and the second memory to indicate a first physical address range associated with the first memory and a second physical address range associated with the second memory.

15. The non-transitory machine-readable medium of claim 14, wherein the method further comprises accessing the memory configuration on a page walk to obtain a translation for the memory access request, and storing an entry in the TLB including the translation and a location indicator having a first value to indicate that the PA is in the first memory, when the PA is within the first physical address range.

16. A system comprising:
a processor having a first core including a first memory management unit (MMU), the first MMU including a plurality of entries each to store a virtual address to physical address translation, wherein each entry includes a counter to store a count of a number of accesses by the processor to a memory location of a second memory associated with an accelerator coupled to the processor, wherein when the counter of an entry reaches a threshold value, the processor is to move data stored in the memory location associated with the entry from the memory location of the second memory to a memory location of a system memory coupled to the processor;

the accelerator coupled to the processor via a link, the accelerator including a second processor and a second MMU; and the system memory coupled to the processor.

17. The system of claim 16, wherein each entry of the first MMU further includes a first field to store an indicator to indicate whether a memory location for the corresponding entry is present in the system memory or in the second memory.

18. The system of claim 17, wherein the processor is to directly address a memory location present in the second memory using information in an entry of the first MMU.

19. The system of claim 16, wherein the processor is to move the data from the memory location of the second memory to the memory location of the system memory responsive to an interrupt occurring when the counter reaches the threshold value, without involvement of an application executing on the processor.

20. The system of claim 16, wherein the processor and the accelerator are formed of a single semiconductor die, and wherein the second memory is a partitioned portion of the system memory.

\* \* \* \* \*